(12) United States Patent
Zimmermann et al.

(10) Patent No.: US 9,452,728 B2
(45) Date of Patent: Sep. 27, 2016

(54) SEAT ASSEMBLY HAVING A SIDE AIRBAG MODULE

(71) Applicant: LEAR CORPORATION, Southfield, MI (US)

(72) Inventors: Matthias Zimmermann, Munich (DE); Eike Goetze, Boeblingen (DE); Michael Tracht, Altheim (DE)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 14/947,907

(22) Filed: Nov. 20, 2015

(65) Prior Publication Data

US 2016/0185312 A1    Jun. 30, 2016

(30) Foreign Application Priority Data

Dec. 30, 2014    (DE) ........................ 10 2014 227 036

(51) Int. Cl.
*B60R 21/207*    (2006.01)
*B60R 21/201*    (2011.01)
*B60R 21/215*    (2011.01)
*B60R 21/237*    (2006.01)
*B60R 21/232*    (2011.01)
*B60R 21/231*    (2011.01)
*B60R 21/26*    (2011.01)
*B60R 21/00*    (2006.01)
*B60R 21/16*    (2006.01)

(52) U.S. Cl.
CPC ........... *B60R 21/207* (2013.01); *B60R 21/201* (2013.01); *B60R 21/215* (2013.01); *B60R 21/232* (2013.01); *B60R 21/237* (2013.01); *B60R 21/23138* (2013.01); *B60R 21/26* (2013.01); *B60R 2021/0006* (2013.01); *B60R 2021/0032* (2013.01); *B60R 2021/161* (2013.01); *B60R 2021/23146* (2013.01)

(58) Field of Classification Search
CPC . B60R 21/207; B60R 21/201; B60R 21/215; B60R 21/23138; B60R 2021/23146
USPC ........................................................ 280/730.2
See application file for complete search history.

(56) References Cited

U.S. PATENT DOCUMENTS

| | | | |
|---|---|---|---|
| 5,863,063 A | 1/1999 | Harrell | |
| 5,992,878 A * | 11/1999 | Narita | ................... B60R 21/207 280/728.2 |
| 6,942,242 B2 | 9/2005 | Hawthorn et al. | |
| 7,357,412 B2 | 4/2008 | Tracht et al. | |
| 7,543,847 B2 | 6/2009 | Tracht | |

(Continued)

FOREIGN PATENT DOCUMENTS

| | | |
|---|---|---|
| DE | 19848905 A1 | 5/1999 |
| DE | 69709778 T2 | 8/2002 |

(Continued)

OTHER PUBLICATIONS

German Patent and Trademark Office, German Office Action for corresponding German Patent Application No. DE 10 2014 227 036.7 dated Jun. 15, 2015.

*Primary Examiner* — Faye M Fleming
(74) *Attorney, Agent, or Firm* — Brooks Kushman P.C.

(57) ABSTRACT

A seat assembly that may include a seat back, an airbag module having an airbag, and a reinforcement chute. The seat back may have a seat back frame that may have a side member. The reinforcement chute may be fixedly coupled to the side member above and below the airbag module.

20 Claims, 5 Drawing Sheets

(56) References Cited

U.S. PATENT DOCUMENTS

| | | |
|---|---|---|
| 7,681,910 B2 | 3/2010 | Wieczorek et al. |
| 8,104,789 B2 | 1/2012 | Tracht et al. |
| 8,167,333 B2 | 5/2012 | Tracht et al. |
| 8,176,863 B2 | 5/2012 | Evans et al. |
| 8,585,079 B2 | 11/2013 | Gorman et al. |
| 8,820,780 B2 | 9/2014 | Thomas |
| 2013/0257120 A1 | 10/2013 | Tracht et al. |
| 2014/0191496 A1 | 7/2014 | Tracht |
| 2015/0251623 A1* | 9/2015 | Fujiwara ............... B60R 21/207 280/728.2 |

FOREIGN PATENT DOCUMENTS

| | | |
|---|---|---|
| DE | 102005057504 A1 | 6/2006 |
| DE | 102007033799 A1 | 3/2008 |
| DE | 102007011823 A1 | 9/2008 |
| DE | 102008016094 A1 | 10/2008 |
| DE | 102009057286 A1 | 7/2010 |

* cited by examiner

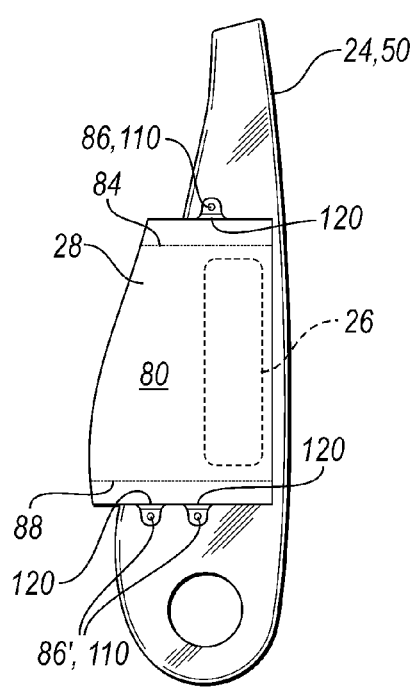
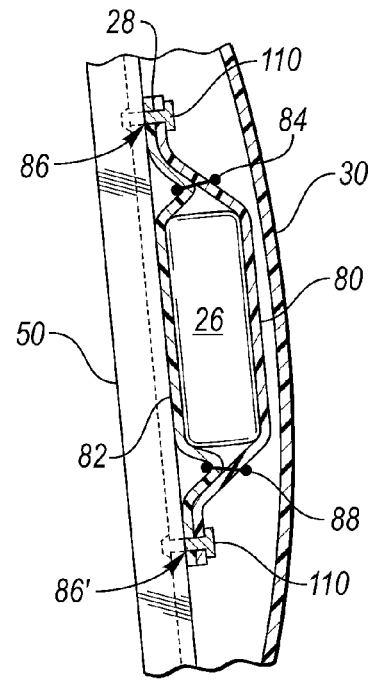
FIG. 3
FIG. 4
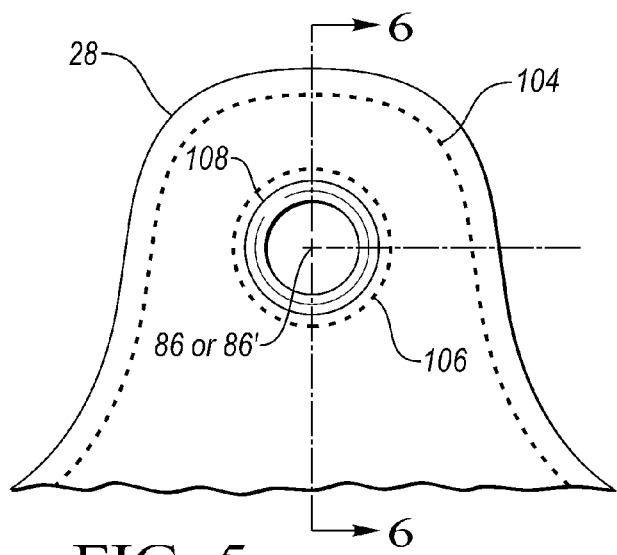
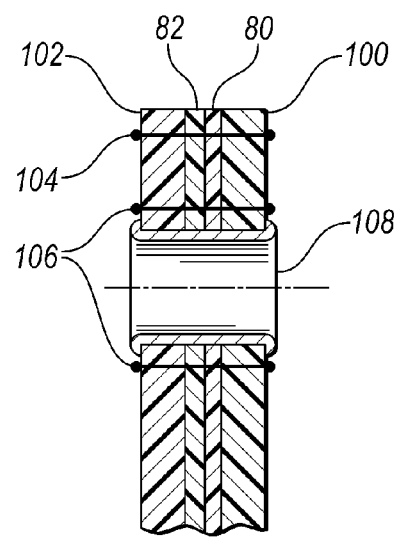
FIG. 5
FIG. 6

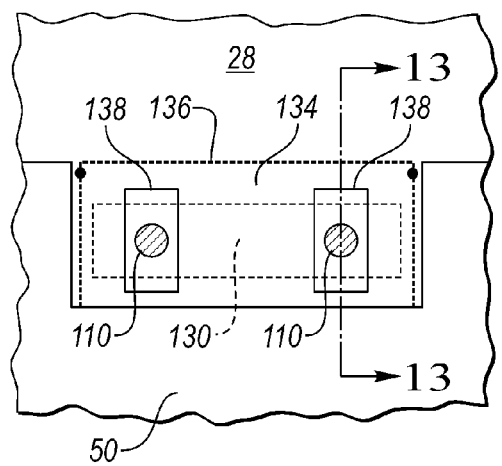
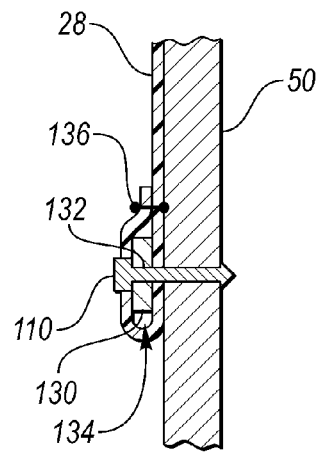
FIG. 12  FIG. 13
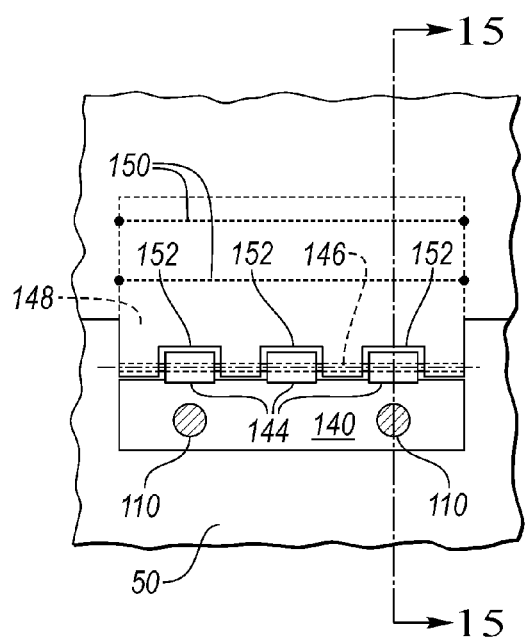
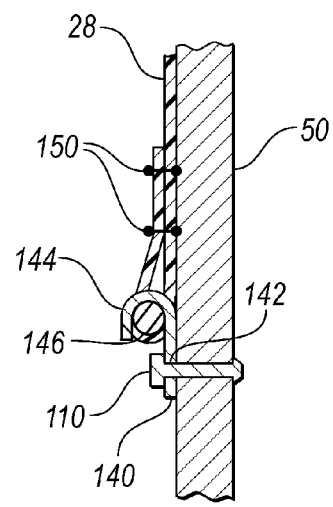
FIG. 14  FIG. 15

SEAT ASSEMBLY HAVING A SIDE AIRBAG MODULE

TECHNICAL FIELD

This patent application relates to a seat assembly having a side airbag module.

BACKGROUND

A vehicle seat assembly having a side airbag module is disclosed in U.S. Pat. No. 8,876,154.

SUMMARY

In at least one embodiment, a seat assembly is provided. The seat assembly may include a seat back, an airbag module, a side trim panel, and a reinforcement chute. The seat back may have a seat back frame that may have a side member. The airbag module may be disposed proximate the side member. The airbag module may have an airbag and an inflator that may be adapted to provide an inflation gas to inflate the airbag from a stored condition to an inflated condition. The side trim panel may provide an exterior surface of the seat back and may conceal the airbag module. The reinforcement chute may be fixedly coupled to the side member above and below the airbag module. At least a portion of the reinforcement chute may be disposed between the side trim panel and the airbag module.

In at least one embodiment, a seat assembly is provided. The seat assembly may have a seat back, an airbag module, a reinforcement chute, and a side trim panel. The seat back may have a seat back frame that may have a side member. The airbag module may be disposed on the side member. The airbag module may have an airbag and an inflator that may be adapted to provide an inflation gas to inflate the airbag from a stored condition to an inflated condition. The reinforcement chute may be fixedly coupled to the side member above and below the airbag module. The reinforcement chute may include a first panel and an energy absorption member. The first panel may be disposed between the side trim panel and the airbag module. The first panel may have a fold. The energy absorption member may secure the fold when the airbag is in the stored condition and may separate to permit the reinforcement chute to unfold when the airbag is inflated from the stored condition to the inflated condition. The side trim panel may provide an exterior surface of the seat back and may conceal the airbag module and the reinforcement chute when the airbag is in the stored condition.

In at least one embodiment, a seat assembly is provided. The seat assembly may include a seat bottom, a seat back, an airbag module, a side trim panel, and a reinforcement chute. The seat back may be pivotally disposed on the seat bottom. The seat back may have a seat back frame that may have a side member that may extend away from the seat bottom. The airbag module may be disposed on the side member. The airbag module may have an airbag and an inflator that may be adapted to provide an inflation gas to inflate the airbag from a stored condition to an inflated condition. The side trim panel may conceal the airbag module when the airbag is in the stored condition. The side trim panel may provide an exterior surface of the seat back. The reinforcement chute may be fixedly coupled to the side member above and below the airbag module. The reinforcement chute may be at least partially disposed between the side trim panel and the airbag module and may be fixedly coupled to the side member below the airbag module via a mounting bracket.

BRIEF DESCRIPTION OF THE DRAWINGS

FIG. 3 is a side view of a portion of the seat back showing a seat back frame side member, an airbag module, and a reinforcement chute.

FIG. 4 is a front view of a portion of the seat back showing the airbag module and an embodiment of a reinforcement chute.

FIG. 5 shows a magnified portion of the reinforcement chute.

FIG. 6 is a section view along section line 6-6.

FIG. 12 is a side view of a reinforcement chute having a mounting bracket.

FIG. 13 is a section view along section line 13-13.

FIG. 14 is a side view of a reinforcement chute that is coupled to a mounting bracket.

FIG. 15 is a section view along section line 15-15.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
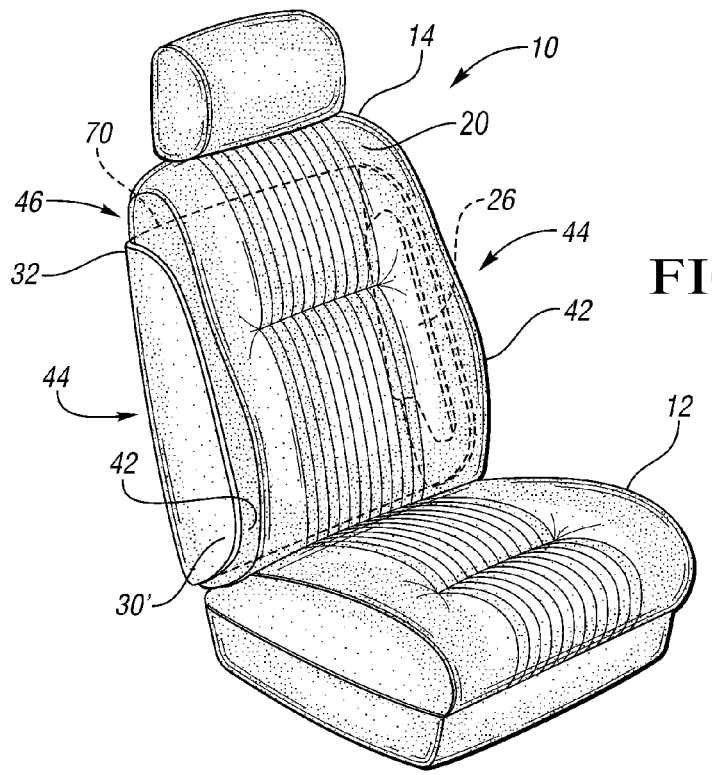
FIG. 1 is a perspective view of an exemplary seat assembly having a seat back.

Referring to FIG. 1, an exemplary seat assembly 10 is shown. The seat assembly 10 may be provided with a motor vehicle, such as a car or truck. The seat assembly 10 may include a seat bottom 12 and a seat back 14. The seat bottom 12 may be adapted to be mounted to the vehicle. The seat back 14 may be pivotally disposed on the seat bottom 12 such that the seat back 14 may pivot or rotate about an axis of rotation with respect to the seat bottom 12.

Figure 2:
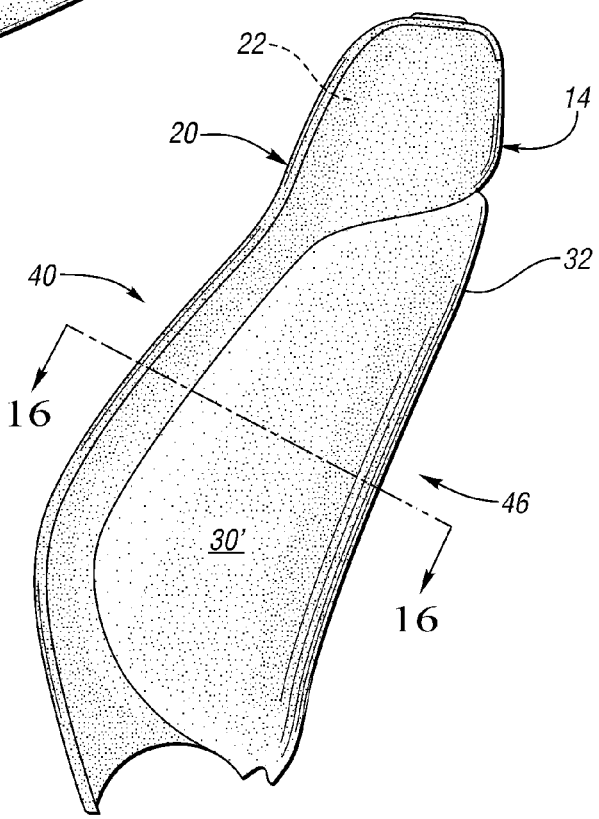
FIG. 2 is a side view of a portion of the seat back shown in FIG. 1.

Referring to FIGS. 2-4, an example of a seat back 14 is shown in more detail. The seat back 14 may include trim cover 20, a cushion 22, a seat back frame 24, an airbag module 26, a reinforcement chute 28, and a side trim panel 30. The side trim panel 30 may be part of the trim cover 20 or part of a back panel module 32 as will be discussed in more detail below.

The trim cover 20 may form an exterior surface of at least a portion of the seat back 14. In addition, the trim cover 20 may engage and may at least partially cover or conceal the cushion 22. As is best shown in FIGS. 1 and 2, the trim cover 20 may extend across a front side 40 of the seat back 14 that may be configured to support a seat occupant. In addition, the trim cover 20 may extend around side bolsters 42 that may protrude forward and may be disposed along the lateral sides 44 of the seat back 14. The trim cover 20 may extend along a lateral side 44 toward a back side 46 of the seat back 14 that may be disposed opposite the front side 40. The trim cover 20 may or may not extend over the airbag module 26. For example, the trim cover 20 may not extend over the airbag module 26 when a back panel module 32 is provided that extends along the lateral side 44 of the seat back 14 over the airbag module 26. The trim cover 20 may extend over the airbag module 26 when a back panel module 32 does not extend along the lateral side 44 of the seat back 14 over the airbag module 26. The trim cover 20 may be made of any suitable material, such as fabric, vinyl, leather, or combinations thereof.

The cushion 22 may be configured to help support a seat occupant. The cushion 22 may be made of any suitable material, such as foam or a molded polymeric material. The cushion 22 may be supported by the seat back frame 24 and may be attached to the seat back frame 24 at various locations.

Referring to FIGS. 3 and 4, the seat back frame 24 may provide a support structure for the seat back 14 and facilitate mounting of components to the seat back 14. The seat back frame 24 may have any suitable configuration and may be made of any suitable material, such as a polymeric material and/or metal. The seat back frame 24 may be configured to support the back of a seat occupant. In at least one embodiment, the seat back frame 24 may include a pair of seat back side members 50.

The seat back side members 50 may be spaced apart from each other and may extend along opposing lateral sides 44 of the seat assembly 10 or along the left and right sides of the seat assembly 10. As such, the seat back side members 50 may extend away from the seat bottom 12 and in a generally upward direction when the seat back 14 is in the nominal seating position in which the seat assembly 10 may be positioned to receive a seat occupant in a seated position. The seat back side members 50 may be interconnected by upper and lower cross members that may be disposed proximate the top and bottom of the seat back 14, respectively.

Figure 17:
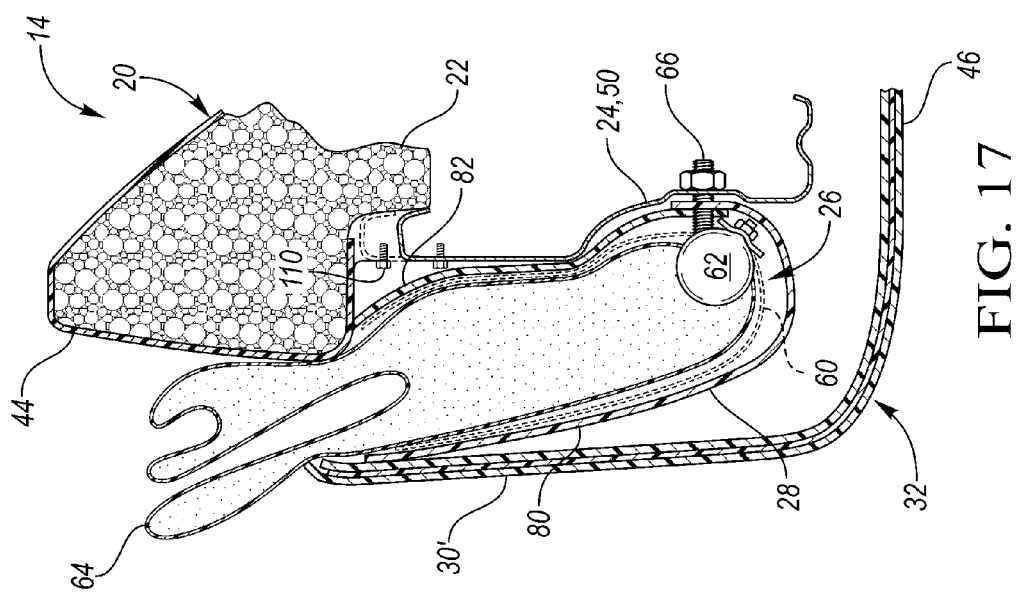
FIG. 17 is a section view of the seat back with the airbag expanding to the inflated condition.
Figure 16:
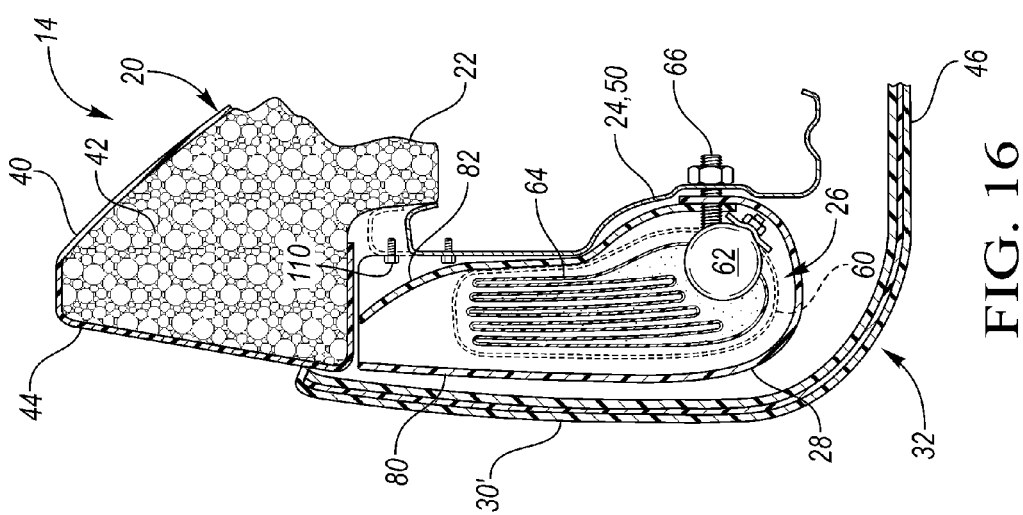
FIG. 16 is a section view of the seat back along section line 16-16 with the airbag in a stored condition.

The airbag module 26 may be mounted within the seat back 14 and may be configured to deploy an airbag to help protect a seat occupant. For example, the airbag module 26 may be mounted to or may be fixedly disposed on a portion of the seat back frame 24, such as a side member 50. As such, an airbag module 26 may be disposed near a lateral side 44 of the seat back 14. In addition, multiple airbag modules 26 may be provided such that at least one airbag module 26 may be disposed proximate a first lateral side 44, such as a left side of the seat back 14, and at least one airbag module 26 may be disposed proximate a second lateral side 44, such as a right side of the seat back 14. As is best shown in FIGS. 16 and 17, the airbag module 26 may include a housing 60, an inflator 62, and an airbag 64.

The housing 60 may be configured to receive at least a portion of the airbag 64 when the airbag 64 is deflated or in a stored condition. The housing 60 may have a "soft" configuration or a "hard" configuration. In a soft configuration, the housing 60 may include a flexible cover, band, strap, or wrap that may extend around a deflated airbag 64 to hold or package the airbag 64 prior to deployment. In a hard configuration, the housing 60 may be a rigid container, such as a plastic or metal box, that may receive the deflated airbag 64. In either configuration, the housing 60 may open or separate in response to force exerted by the airbag 64 when the airbag 64 is inflated or deployed. A representation of a housing 60 is illustrated with dashed lines in FIGS. 16 and 17.

The inflator 62 may provide an inflation gas to the airbag 64 to inflate the airbag 64 from a stored condition to an inflated condition. The inflator 62 may be fixedly positioned with respect to the seat back frame 24. For example, the inflator 62 may be mounted to the side member 50 near the back side 46 of the seat back 14 so as to not impede deployment of the airbag 64. The inflator 62 may be mounted in any suitable manner, such as with an inflator fastener 66 like a stud or bolt. The inflator 62 may be disposed in the housing 60. Alternatively, the inflator 62 may be disposed outside the housing 60 and may be fluidly connected to the airbag 64 via a tube.

The airbag 64 may be configured to deploy out of the seat back 14 when inflated. Moreover, the airbag 64 may be configured to cushion the head, thorax, and/or pelvis of the seat occupant when deployed. The airbag 64 may be configured to expand from a deflated or stored condition to an inflated or deployed condition when inflation gas is provided to the airbag 64. In the stored condition, which is shown in FIG. 16, the airbag 64 may be deflated and may be folded or stored in the seat back 14 and/or the housing 60. As such, the airbag 64 may be covered or concealed by the side trim panel 30 and may not be visible from outside the seat assembly 10. In the deployed condition, the airbag 64 may expand and exit the seat back 14. For example, the airbag 64 may exit the seat back 14 between the trim cover 20 and the back panel module 32 or may exit the seat back 14 by severing a deployment seam which may be provided in the trim cover 20 in a manner known by those skilled in the art. The airbag 64 may be positioned between a seat occupant and an interior vehicle surface when fully inflated.

For clarity, the side trim panel 30 may be part of the trim cover 20 and/or may be part of the back panel module 32. For example, the side trim panel 30 may be a portion of the trim cover 20 that extends along the lateral side 44 of the seat back 14. The side trim panel 30 may include one or more pieces of material that may be attached to each other, such as with stitching or a seam. Such a configuration may be employed when the seat back 14 does not have a back panel module 32 that wraps around the back and lateral sides of the seat back 14. A side trim panel 30 that is provided with the back panel module 32 is referenced with number 30' below.

The back panel module 32, if provided, may form a visible exterior portion of the seat back 14 that may be visible from outside the seat assembly 10. The back panel module 32 may be disposed rearward of the deployment path of the airbag 64. As is best shown in FIG. 1, the back panel module 32 may include a back panel 70 and at least one side trim panel 30'.

The back panel 70 may extend across the back side 46 of the seat back 14. The back panel 70 may be visible from outside the seat assembly 10.

One or more side trim panels 30' may extend from the back panel 70 to the trim cover 20 and may wrap around or extend forward along a portion of the lateral sides 44 of the seat back 14. As such, the side trim panel 30' may be visible from outside the seat assembly 10. The side trim panel 30' may cooperate with the back panel 70 to conceal the airbag module 26 prior to airbag deployment. For example, the side trim panel 30' may extend further forward or toward the front side 40 of the seat assembly 10 than the airbag module 26 to conceal the airbag module 26 when the airbag 64 is in the stored condition. The side trim panel 30' may or may not flex when the airbag 64 is deployed. The side trim panel 30' may have one or more layers and may be spaced apart from the airbag module 26 such that a gap may be provided between the side trim panel 30' and the airbag module 26 and/or the reinforcement chute 28. It is also contemplated that the side trim panel 30' may be attached to the side trim panel 30 in one or more embodiments.

Referring to FIG. 3, the reinforcement chute 28 may be configured to help direct deployment of the airbag 64. The reinforcement chute 28 may be fixedly coupled to the side member 50 of the seat back frame 24. More specifically, the reinforcement chute 28 may be fixedly coupled to the side member 50 above the airbag module 26 and/or below the airbag module 26. In addition, the reinforcement chute 28 may be open or may not be fixedly attached to the seat back frame 24 in a direction that extends toward the front side 40 of the seat back 14 or to the left from the perspective shown in FIG. 3. The reinforcement chute 28 may help direct the airbag 64 away from a side panel 30, 30' to inhibit damage.

Referring to FIGS. 3 and 4, the reinforcement chute 28 may include one or more panels. For example, the reinforcement chute 28 may include a first panel 80 and a second panel 82. The first panel 80 and the second panel 82 may be made of any suitable material or materials and may be a film, textile, sheet, or the like. The first panel 80 and the second panel 82 may or may not be separate pieces. For instance, the first panel 80 and the second panel 82 may be a unitary component or may be separate components that may be directly fastened to each other, such as by stitching, or may not be directly fastened to each other. For instance, separate first and second panels 80, 82 may be attached to the inflator fastener 66, but may not be stitched to fixed to each other in one or more embodiments. As such, reference to the first panel 80 and the second panel 82 may be used to designate positioning relative to the airbag module 26.

The first panel 80 may be disposed on the outboard side of the airbag module 26. As such, the first panel 80 may be disposed between the airbag module 26 and the side trim panel 30, 30'. The first panel 80 may be held in tension and may be stretched taut over the airbag module 26. As such, the first panel 80 may resist or help inhibit deployment of the airbag 64 in a lateral outboard direction that may extend substantially perpendicular to the side member 50 of the seat back frame 24 until the airbag 64 extends forwardly past one or more points of attachment to the side member 50.

The second panel 82 may be disposed on the inboard side of the airbag module 26. As such, the second panel 82 may be disposed between the airbag module 26 and the side member 50 of the seat back frame 24. The second panel 82 may be attached to the first panel 80. For example, the second panel 82 may be attached to the first panel 80 above the airbag module 26 and below the airbag module 26. The second panel 82 may be attached to the first panel 80 in any suitable manner, such as with stitching or an attachment seam. The second panel 82 may be attached to or stitched to the first panel 80 between the airbag module 26 and one or more points of attachment where the first panel 80 is attached to the side member 50 or the first panel 80 and the second panel 82 are attached to the side member. For example, a first compression seam 84 may be disposed above the airbag module 26 and below an upper attachment point 86 where the first panel 80 is attached to the side member 50. A second compression seam 88 may be disposed below the airbag module 26 and above a lower attachment point 86'. As is best shown in FIG. 4, the first compression seam 84 may be completely disposed above the airbag module 26 and the second compression seam 88 may be completely disposed below the airbag module 26. In addition, the first compression seam 84 may be disposed substantially parallel to the second compression seam 88. The compression seams 84, 88 may help provide a compression force that may resist and help direct the initial deployment of the airbag 64, which may help reduce airbag deployment time and may help suppress deployment of the airbag 64 in the Z direction or toward the top and bottom of the seat assembly 10 (e.g., above and below the airbag module 26).

The second panel 82 may be disposed between the side member 50 and the airbag module 26 and between the side member 50 and the first panel 80. As such, the second panel 82 may help protect the airbag 64 from engaging sharp edges of the seat back frame 24 during deployment. The second panel 82 may or may not be attached to the side member 50. In the embodiment shown in FIG. 4, the second panel 82 engages the side member 50 proximate the airbag module 26 and extends to the upper and lower ends or edges of the first panel 80 such that the second panel 82 is disposed between the first panel 80 and the side member 50 at the upper attachment point 86 and at the lower attachment point 86'. As such, the second panel 82 may be disposed between and may engage the side member 50 and the first panel 80. It is contemplated that the second panel 82 may not extend to the upper attachment point 86 and/or to the lower attachment point 86' in one or more embodiments. For example, the second panel 82 may end between the first compression seam 84 and the upper attachment point 86 and/or between the second compression seam 88 and the lower attachment point 86'. In such a configuration, the second panel 82 may not be directly attached to the side member 50 or may have a shorter vertical height than is shown in FIG. 4.

At least one upper attachment point 86 and/or at least one lower attachment point 86' may be provided with the reinforcement panel configurations described in this application. As such, multiple upper attachment points 86 and/or multiple lower attachment points 86' may be provided in various configurations. In addition, the upper and lower attachment points 86, 86' may or may not be positioned outward of the main upper and lower ends of the reinforcement panel 28. For example, the upper and lower attachment points 86, 86' in FIG. 3 are illustrated as being positioned on lobes that extend from the upper and lower ends of the reinforcement panel 28, but is it contemplated that the lobes may be omitted and the upper and/or lower attachment points 86, 86' may be located closer to the airbag module 26 from the positioning shown.

Referring to FIGS. 5 and 6, the first panel 80 and/or the second panel 82 may include a reinforcement layer that may be disposed proximate an attachment point 86, 86'. The reinforcement layer may help strengthen the reinforcement chute 28 and provide localized reinforcement proximate an attachment point 86, 86' to help inhibit tearing of the reinforcement chute 28 and/or disengagement of the reinforcement chute 28 from the side member 50. For example, the reinforcement chute 28 may include a first reinforcement panel 100 and/or a second reinforcement panel 102.

The first reinforcement panel 100 may be fixedly disposed on the first panel 80 and may extend around an attachment point 86, 86' that may be configured as a hole that may extend through the reinforcement chute 28. In at least one embodiment, the first reinforcement panel 100 may be disposed on an outboard side of the first panel 80 and may face away from the side member 50. The first reinforcement panel 100 may be locally disposed on the reinforcement chute 28. As such, the first reinforcement panel 100 may be disposed proximate an attachment point 86, 86' but may not extend continuously across the reinforcement chute 28 and may not extend over the airbag module 26. The first reinforcement panel 100 may be attached to the first panel 80 and/or the second panel 82 in any suitable manner, such as with an adhesive and/or a stitched seam 104. In addition, the first reinforcement panel 100 may be made of any suitable material or materials. For example, the first reinforcement panel 100 may be a fabric, textile, or polymeric material. The first reinforcement panel 100 may also have a greater thickness than the first panel 80 and/or the second panel 82 in one or more embodiments. Such a thickness may help strengthen the first reinforcement panel 100 and/or may facilitate detection as to the presence or absence of the reinforcement chute 28 during mounting, and more specifically a reinforcement chute 28 having multiple layers or panels.

The second reinforcement panel 102 may be fixedly disposed on the second panel 82 and may extend around an attachment point 86, 86' that may be configured as a hole that may extend through the reinforcement chute 28. In at least one embodiment, the second reinforcement panel 102 may be disposed on a side of the second panel 82 and may face toward and may engage the side member 50. The second reinforcement panel 102 may be locally disposed on the reinforcement chute 28. As such, the second reinforcement panel 102 may be disposed proximate an attachment point 86, 86' but may not extend continuously across the reinforcement chute 28 and may not extend over the airbag module 26. The second reinforcement panel 102 may be attached to the first panel 80 and/or the second panel 82 in any suitable manner, such as with an adhesive and/or a stitched seam 104. In addition, the second reinforcement panel 102 may be made of any suitable material or materials. For example, the second reinforcement panel 102 may be a fabric, textile, or polymeric material. The second reinforcement panel 102 may also have a greater thickness than the first panel 80 and/or the second panel 82 in one or more embodiments. Such a thickness may help strengthen the second reinforcement panel 102 and/or may facilitate detection as to the presence or absence of the reinforcement chute 28 during mounting, and more specifically a reinforcement chute having multiple layers as discussed above.

Figure 7:
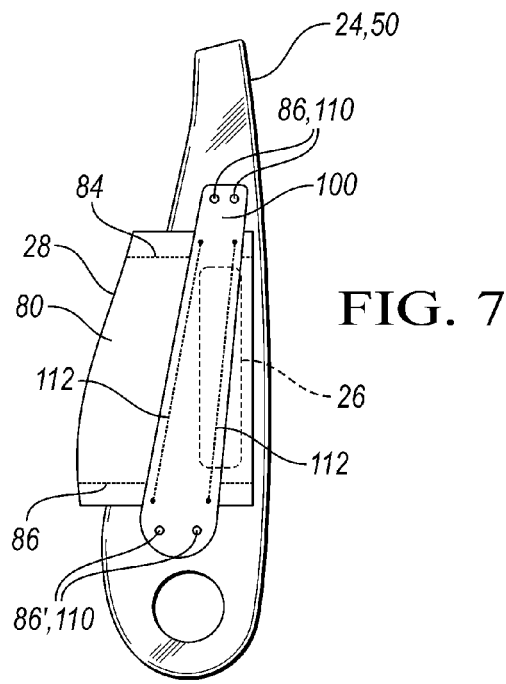
FIG. 7 is a side view of a portion of a seat back showing a seat back frame side member, an airbag module, and another embodiment of a reinforcement chute.

Referring to FIG. 7, another reinforcement chute 28 configuration is shown. In this embodiment, the first reinforcement panel 100 may extend continuously across the first panel 80 of the reinforcement chute 28 such that the first reinforcement panel 100 may include one or more attachment points 86, 86' that may receive fasteners 110 rather than the first panel 80 and/or the second panel 82. As such, the first reinforcement panel 100 may extend over or across at least a portion of the airbag module 26 and may extend above and below the top and bottom edges or ends of the first panel 80 and/or the second panel 82. The first reinforcement panel 100 may be attached to the first panel 80 with one or more attachment seams 112. In FIG. 7, two attachment seams 112 are shown that are spaced apart from each other and extend in a generally vertical direction from the top to the bottom of the first panel 80. For example, the first reinforcement panel 100 may be fixedly disposed on a surface or side of the first panel 80 that may be disposed opposite the airbag module 26 such that the first reinforcement panel 100 is disposed between the side trim panel 30, 30' and the airbag module 26 and the first reinforcement panel 100 is fixedly coupled to the side member 50 above the airbag module 26 and below the airbag module 26. It is also contemplated that the first reinforcement panel 100 may be disposed between the airbag module 26 and the first panel 80 or on the opposite side of the first panel 80 from that shown in FIG. 7. In addition, it is contemplated that the reinforcement chute 28 may simply be configured as the first reinforcement panel 100 in one or more embodiments.

The reinforcement chute 28 may also include other reinforcement features. For example, the reinforcement chute 28 may include a reinforcement seam 106 that may extend around the attachment point 86, 86'. Alternatively, or in addition, the reinforcement chute 28 may include a grommet or eyelet 108 that may extend through the attachment point 86, 86'. The eyelet 108 may be made of any suitable material, such as metal, that can withstand load forces associated with airbag deployment without structural failure. In addition, the eyelet 108 may extend through the first panel 80, the second panel 82, the first reinforcement panel 100, and/or the second reinforcement panel 102.

Each attachment point 86, 86' that is configured as a hole may receive a fastener 110 that may fixedly attach the reinforcement chute 28 to the side member 50. The fastener 110 may have any suitable configuration. For example, the fastener 110 may be configured as a threaded fastener, such as a screw or an unthreaded fastener, such as a rivet. In addition, the fastener 110 may differ from and may not be used to attach the air bag module 26 to the side member 50. For instance, the attachment points 86, 86' may not receive a fastener, such as a stud, that may extend from the inflator 62.

Referring to FIGS. 8-11, the reinforcement chute 28 may include one or more folds 120 and one or more energy absorption members 122. The reinforcement chute 28 may be folded against itself one or more times at a fold 120. A fold 120 may be disposed proximate one or more attachment points 86, 86' or fasteners 110. For instance, one or more folds 120 may be located near the upper attachment points 86 and one or more other folds 120 may be located near the lower attachment points 86'.

The energy absorption member 122 may secure an associated fold 120 or hold the reinforcement chute 28 in a folded position when the airbag 64 is in the stored condition. For example, the energy absorption member 122 may extend through the reinforcement chute 28 and its associated fold 120. The energy absorption member 122 may sever or separate to permit the reinforcement chute 28 to unfold when the airbag 64 is inflated from the stored condition to the inflated condition. The energy absorption member 122 may have any suitable configuration. For example, the energy absorption member 122 may include one or more stitches or seams that may extend through the reinforcement chute 28 to secure a fold 120 or may be a hook and loop fastener.

Folds 120 and energy absorption members 122 may be provided in various quantities and configurations.

Figure 8:
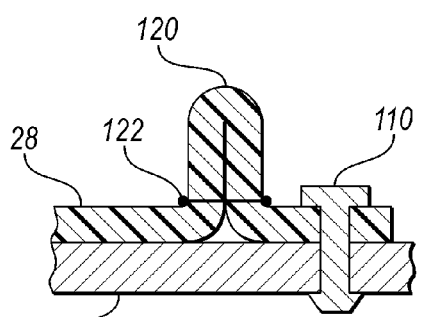
FIG. 8 is a section view of a reinforcement chute in an exemplary folded condition.

Referring to FIG. 8, an example of a single fold 120 is shown. The fold 120 may be completely disposed between the fastener 110 and the airbag module 26 as is best shown in FIG. 3. The fold 120 may extend away from the side member 50. In addition, the fold 120 may be completely disposed between the fastener 110 and the airbag module 26 or a compression seam 84, 88 and may extend away from the side member 50. The energy absorption member 122 may be disposed opposite and may be spaced apart from the side member 50. It is contemplated that the fold 120 shown in FIG. 8 may be repeated or duplicated in series to provide additional energy absorption as compared to a single fold 120. Moreover, additional energy absorption members 122 may be provided to secure the fold 120.

Figure 9:
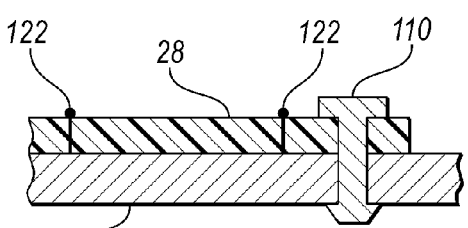
FIG. 9 is a section view of the reinforcement chute of FIG. 8 in an unfolded condition.

Referring to FIG. 9, the reinforcement chute 28 is shown after the airbag 64 is inflated from the stored condition to the inflated condition. Sufficient force exerted by the airbag 64 against the reinforcement chute 28 may cause the energy absorption member 122 to sever or separate, which in turn may allow the reinforcement chute 28 to unfold. As such, the energy absorption member 122 may help absorb energy during airbag deployment that may otherwise be transferred to an adjacent or associated attachment point 86, 86' or fastener 110, which may help inhibit tearing of the reinforcement chute 28 proximate the attachment point 86, 86' and/or disengagement of the reinforcement chute 28 from the side member 50.

Figure 10:
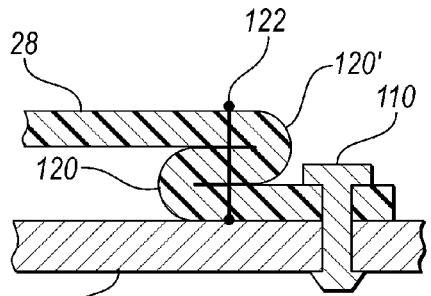
FIG. 10 is a section view of a reinforcement chute in a folded condition.

Referring to FIG. 10, an example of a multiple folds is shown. In this configuration, the reinforcement chute 28 is folded against itself at least two times. As such, the reinforcement chute 28 may have a first fold 120 and a second fold 120' that may be disposed adjacent to the first fold 120. The second fold 120' may be folded against the first fold 120 to form a serpentine configuration. The folds 120, 120' may be completely disposed between the fastener 110 and the airbag module 26 or a compression seam 84, 88 and may extend away from the side member 50. The energy absorption member 122 may extend through the first fold 120 and the second fold 120' to secure the folds. For example, the energy absorption member 122 may extend through the reinforcement chute 28 three or more times to secure multiples folds. In addition, it is contemplated that additional energy absorption members 122 may be provided to secure one or more folds 120, 120'

Figure 11:
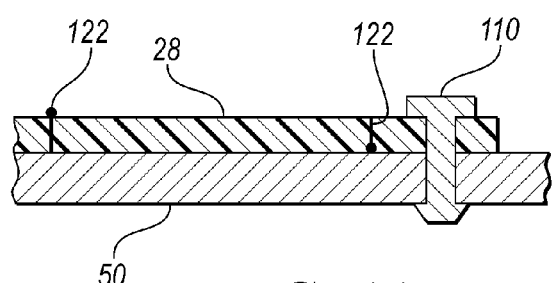
FIG. 11 is a section view of the reinforcement chute of FIG. 10 in an unfolded condition.

Referring to FIG. 11, the reinforcement chute 28 is shown after the airbag 64 is inflated from the start condition to the inflated condition. Sufficient force exerted by the airbag 64 against the reinforcement chute 28 may cause the energy absorption member 122 to sever or separate, which in turn may allow the reinforcement chute 28 to unfold. The reinforcement chute 28 may increase in length by a greater amount when the energy absorption member 122 is severed. In this embodiment, as compared to the embodiment shown in FIGS. 8 and 9 due to the length of the reinforcement chute 28 that is captured in the fold 120 by the energy absorption member 122.

Referring to FIGS. 12 and 13, an example of a reinforcement chute 28 is shown that is secured with a mounting bracket 130. The mounting bracket 130 may help distribute load forces and may help inhibit tearing of the reinforcement chute 28 proximate the side member 50. The mounting bracket 130 may include one or more holes 132 that may receive a fastener 110. In FIGS. 12 and 13, two holes 132 are provided for fasteners 110; however, it is contemplated that a greater or lesser number of holes 132 may be provided. The mounting bracket 130 may be attached to and may be received in the reinforcement chute 28. For example, the reinforcement chute 28 may be folded around the mounting bracket 130 to form a pocket 134 that may be held together with one or more pockets seams 136. As such, the reinforcement chute 28 may be folded against itself to form the pocket 134 and the mounting bracket 130 may be separated from and may not engage the side member 50. The reinforcement chute 28 may include one or more fastener openings 138 that may be aligned with one or more corresponding holes 132 when the mounting bracket 130 is received in the pocket 134. The fastener opening 138 may make a hole 132 in the mounting bracket 130 visible to facilitate installation of an associated fastener 110.

Referring to FIGS. 14 and 15, another example of mounting bracket 140 that may be used to secure a reinforcement chute 28 is shown. In this embodiment, the mounting bracket 140 may not be received in the reinforcement chute 28. Instead, the mounting bracket 140 may include one or more holes 142 and one or more hooks 144. A hole 142 may receive a fastener 110 that may fixedly attach the mounting bracket 140 to the side member 50. As such, the mounting bracket 140 may be disposed on and may engage the side member 50. A hook 144 may extend away from the side member 50 and may be configured to receive a mounting rod 146 that may be provided with the reinforcement chute 28. For example, the reinforcement chute 28 may be folded around the mounting rod 146 to form a pocket 148 that may be held together with one or more pocket seams 150. As such, the reinforcement chute 28 may be folded against itself to form the pocket 148 and the mounting rod 146 may be separated from and may not engage the side member 50. The reinforcement chute 28 may also include one or more hook openings 152 that may be disposed proximate the mounting rod 146 and that may extend through the reinforcement chute 28. A hook 144 may extend through a corresponding hook opening 152 when the mounting rod 146 is received in the hook 144. Alternatively, the mounting bracket 140 may be part of the seat back frame 24, such as the side member 50. For instance, a hook 144 may be formed directly in the side member 50 in one or more embodiments.

Referring to FIGS. 16 and 17, an exemplary airbag deployment sequence is shown. In these figures, the seat back is configured such that the airbag 64 may deploy between side member 30' and the trim cover 20; however, it is contemplated that the airbag 64 may deploy through the trim cover 20 by severing a deployment seam in the trim cover. An example of such a configuration is disclosed in U.S. Pat. No. 7,134,685, which is assigned to the assignee of the present application and is incorporated by reference in its entirety. In such a configuration, the ends of the first panel 80 and/or the second panel 82 may or may not be attached to the trim cover 20 on opposite sides of the deployment seam.

In FIG. 16, the airbag 64 is shown prior to inflation. Prior to inflation, the airbag 64 may be folded and stored within the seat back 14 under the reinforcement chute 28. The reinforcement chute 28 may be fastened to the side member 50 and may be held in tension over the airbag module 26. In addition, any folds 120 in the reinforcement chute 28 may be secured by one or more corresponding energy absorption members 122.

In FIG. 17, the airbag 64 is partially inflated. As the airbag 64 is inflated, it exerts force on and exits the housing 60. The airbag 64 may also exert force on the reinforcement chute 28. The reinforcement chute 28 may inhibit expansion of the airbag 64 toward the side trim panel 30, 30' in the region where the reinforcement chute 28 is mounted on the side member 50. As such, the airbag 64 may be directed toward the front of the seat and toward a location where the airbag 64 may deploy from the seat back 14. For example, the airbag 64 may be directed to a deployment seam that may sever to permit the airbag 64 to deploy from the seat back 14. Sufficient force exerted on the reinforcement chute 28 by the airbag 64 may also cause one or more energy absorption members 122 to sever or separate and may permit the reinforcement chute 28 to unfold proximate one or more attachment points 86, 86' when the reinforcement chute 28 has at least one fold 120 as previously discussed. As the airbag 64 continues to inflate, the reinforcement chute 28 may help direct expansion of the airbag 64 toward a target position between the seat occupant and an interior vehicle surface.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A seat assembly comprising:
   a seat back having a seat back frame that has a side member;
   an airbag module disposed proximate the side member, the airbag module having an airbag and an inflator adapted to provide an inflation gas to inflate the airbag from a stored condition to an inflated condition;
   a side trim panel that conceals the airbag module and provides an exterior surface of the seat back; and
   a reinforcement chute that is fixedly coupled to the seat back frame above the airbag module and/or below the airbag module, wherein at least a portion of the reinforcement chute is disposed between the side trim panel and the airbag module, wherein the reinforcement chute includes a first panel that is disposed between the side trim panel and the airbag module and the first panel is held in tension against the airbag module to inhibit expansion of the reinforcement chute toward the side trim panel.

2. The seat assembly of claim 1 wherein the reinforcement chute is fixedly coupled to the side member at a location disposed forward of the airbag module.

3. The seat assembly of claim 1 wherein the reinforcement chute includes a hole that receives a fastener that fixedly couples the reinforcement chute to the side member.

4. The seat assembly of claim 3 wherein the reinforcement chute includes a reinforcement seam that extends around the hole.

5. The seat assembly of claim 3 wherein the reinforcement chute includes a first reinforcement panel that extends around the hole and is fixed to the first panel, wherein the first panel and first reinforcement panel cooperate to define the hole.

6. The seat assembly of claim 3 wherein the reinforcement chute includes a second panel that is disposed between the side member and the airbag module, wherein the first panel and the second panel cooperate to define the hole.

7. The seat assembly of claim 6 wherein the first panel is attached to the second panel with a first compression seam that is disposed above the airbag module and a second compression seam that is disposed below the airbag module.

8. The seat assembly of claim 7 wherein the first compression seam is disposed between the airbag module and an attachment point where the reinforcement chute is attached to the side member.

9. The seat assembly of claim 6 wherein the reinforcement chute includes a first reinforcement panel that is disposed on the first panel and a second reinforcement panel that is disposed on the second panel, wherein the first reinforcement panel and the second reinforcement panel extend around the hole such that the first panel, second panel, first reinforcement panel, and second reinforcement panel cooperate to define the hole.

10. A seat assembly comprising:
    a seat back having a seat back frame that has a side member;
    an airbag module disposed on the side member, the airbag module having an airbag and an inflator adapted to provide an inflation gas to inflate the airbag from a stored condition to an inflated condition;
    a reinforcement chute that is fixedly coupled to the side member above the airbag module and below the airbag module, wherein the reinforcement chute includes:
       a first panel that has a fold; and
       an energy absorption member that secures the fold when the airbag is in the stored condition and that separates to permit the reinforcement chute to unfold when the airbag is inflated from the stored condition to the inflated condition; and
    a side trim panel that provides an exterior surface of the seat back and that conceals the airbag module and the reinforcement chute when the airbag is in the stored condition, wherein the first panel is disposed between the side trim panel and the airbag module.

11. The seat assembly of claim 10 wherein the fold is disposed opposite the side member.

12. The seat assembly of claim 11 wherein the reinforcement chute includes a hole that receives a fastener that extends through the hole to fixedly couple the reinforcement chute to the side member and wherein the fold is disposed proximate the hole.

13. The seat assembly of claim 12 wherein the fold is disposed proximate the hole and the energy absorption member is a seam that extends through the fold when the airbag is in the stored condition and wherein the seam severs to permit the reinforcement chute to unfold when the airbag is inflated from the stored condition.

14. The seat assembly of claim 13 wherein the reinforcement chute is folded against itself at the fold and wherein the seam extends through the fold when the airbag is in the stored condition.

15. The seat assembly of claim 14 wherein the reinforcement chute includes a second fold that is disposed adjacent to the fold, wherein the second fold is folded against the fold and the seam extends through the fold and the second fold.

16. A seat assembly comprising:
    a seat bottom;
    a seat back that is pivotally disposed on the seat bottom and that has a seat back frame that has a side member that extends away from the seat bottom;
    an airbag module disposed on the side member, the airbag module having an airbag and an inflator adapted to provide an inflation gas to inflate the airbag from a stored condition to an inflated condition;
    a side trim panel that provides an exterior surface of the seat back and conceals the airbag module when the airbag is in the stored condition; and
    a reinforcement chute that is fixedly coupled to the side member above the airbag module and below the airbag module, wherein the reinforcement chute is at least partially disposed between the side trim panel and the airbag module and is fixedly coupled to the side member below the airbag module via a mounting bracket wherein the reinforcement chute is folded to form a pocket that receives the mounting bracket.

17. The seat assembly of claim 16 wherein the reinforcement chute includes a first panel that is disposed between the side trim panel and the airbag module, wherein the first panel is held in tension against the airbag module to inhibit expansion of the reinforcement chute toward the side trim panel.

18. A seat assembly comprising:
- a seat bottom;
- a seat back that is pivotally disposed on the seat bottom and that has a seat back frame that has a side member that extends away from the seat bottom;
- an airbag module disposed on the side member, the airbag module having an airbag and an inflator adapted to provide an inflation gas to inflate the airbag from a stored condition to an inflated condition;
- a side trim panel that provides an exterior surface of the seat back and conceals the airbag module when the airbag is in the stored condition; and
- a reinforcement chute that is fixedly coupled to the side member above the airbag module and below the airbag module, wherein the reinforcement chute is at least partially disposed between the side trim panel and the airbag module and is fixedly coupled to the side member below the airbag module via a mounting bracket that is disposed on the side member and includes a hook that extends away from the side member and wherein the reinforcement chute includes a mounting rod that engages the hook to couple the reinforcement chute to the mounting bracket.

19. The seat assembly of claim 18 wherein the reinforcement chute is folded to form a pocket that receives the mounting rod.

20. The seat assembly of claim 18 wherein the reinforcement chute includes a first panel that is disposed between the side trim panel and the airbag module, wherein the first panel is held in tension against the airbag module to inhibit expansion of the reinforcement chute toward the side trim panel.

* * * * *